(12) United States Patent
Shen et al.

(10) Patent No.: US 12,123,753 B2
(45) Date of Patent: Oct. 22, 2024

(54) CAPACITIVE SENSOR WITH TEMPERATURE DRIFT MITIGATION

(71) Applicant: Synaptics Incorporated, San Jose, CA (US)

(72) Inventors: Guozhong Shen, Fremont, CA (US); Chunbo Liu, San Jose, CA (US); Derek Solven, Coquitlam (CA)

(73) Assignee: Synaptics Incorporated, San Jose, CA (US)

( * ) Notice: Subject to any disclaimer, the term of this patent is extended or adjusted under 35 U.S.C. 154(b) by 92 days.

(21) Appl. No.: 17/936,078

(22) Filed: Sep. 28, 2022

(65) Prior Publication Data

US 2024/0060800 A1 Feb. 22, 2024

Related U.S. Application Data

(60) Provisional application No. 63/399,643, filed on Aug. 19, 2022.

(51) Int. Cl.
*G01D 5/24* (2006.01)
*G01B 7/30* (2006.01)
*G06F 3/041* (2006.01)
*G06F 3/044* (2006.01)

(52) U.S. Cl.
CPC ............... *G01D 5/24* (2013.01); *G01B 7/30* (2013.01); *G06F 3/0418* (2013.01); *G06F 3/044* (2013.01); *G06F 2203/04107* (2013.01)

(58) Field of Classification Search
CPC .... G06F 3/0416; G06F 1/169; G06F 3/03547; G06F 3/044; G06F 3/04886; G06F 2203/0339; G06F 3/0448; G06F 3/041662; G06F 3/0443; G06F 2203/04101; G06F 2203/04107; G06F 3/0418; H03K 17/955; G01B 7/30; G01D 5/24
See application file for complete search history.

(56) References Cited

U.S. PATENT DOCUMENTS 9,778,804 B2 10/2017 Liu et al.
10,228,797 B2 3/2019 Roberson et al.
11,119,606 B2 9/2021 Shen
(Continued)

*Primary Examiner* — Raul J Rios Russo
(74) *Attorney, Agent, or Firm* — Leydig, Voit & Mayer, Ltd.

(57) ABSTRACT

A system and method for mitigating background capacitance and for mitigating the effect of temperature drift in compensation circuitry is provided. The system includes a plurality of sensor electrodes including a first sensor electrode and a second sensor electrode. The first sensor electrode is coupled to a first channel and the second sensor electrode is coupled to a second channel. The system includes a processing system configured to drive the plurality of sensor electrodes with a sensing signal; drive the first channel with a first compensation signal and the second channel with a second compensation signal; determine a first differential capacitance between the first channel and the second channel; drive the first channel with the second compensation signal and the second channel with the first compensation signal; determine a second differential capacitance between the first channel and the second channel; and mitigate temperature drift using the first differential capacitance and the second differential capacitance.

20 Claims, 6 Drawing Sheets

(56) References Cited

U.S. PATENT DOCUMENTS

| | | | | |
|---|---|---|---|---|
| 2015/0091848 A1* | 4/2015 | Morein | ............ | G06F 3/041662 |
| | | | | 345/174 |
| 2015/0116253 A1* | 4/2015 | Schwartz | ................ | G01B 7/14 |
| | | | | 345/174 |
| 2015/0286330 A1* | 10/2015 | Shepelev | ............ | G06F 3/04184 |
| | | | | 345/174 |
| 2015/0378467 A1* | 12/2015 | Hoch | .................... | G06F 3/0443 |
| | | | | 345/174 |
| 2019/0163295 A1* | 5/2019 | Vandermeijden | ....... | G06F 3/044 |
| 2022/0214765 A1 | 7/2022 | Liu et al. | | |

* cited by examiner

CAPACITIVE SENSOR WITH TEMPERATURE DRIFT MITIGATION

CROSS REFERENCE TO RELATED APPLICATIONS

This application claims the benefit of U.S. Provisional Application Ser. No. 63/399,643, entitled "Capacitive Sensor with Temperature Drift Mitigation," filed Aug. 19, 2022, the contents of which are expressly incorporated by reference.

TECHNICAL FIELD

This disclosure generally relates to capacitive sensors.

BACKGROUND

Input devices such as touch sensor devices (also commonly called touchpads or proximity sensor devices), are used in a variety of electronic systems. Touch sensor devices typically include a sensing region, often demarked by a surface, in which the touch sensor device determines the presence, location and/or motion of one or more input objects, typically for purposes of allowing a user to provide user input to interact with the electronic system. The input device may be a touchscreen that includes a plurality of electrodes and is also capable of allowing the user to provide user input to interact with the electronic system. In recent years, foldable devices having touchscreens or other types of capacitive sensors have been developed.

Unwanted background capacitance in sensor circuits of touch sensor devices and touchscreens can affect the ability to accurately sense the presence of an input object or other condition. Some input devices employ compensation circuits to counter background capacitance. Compensation circuits can, however, be subject to temperature drift, which can also have an adverse effect on the sensing circuits.

SUMMARY

In an exemplary embodiment, a system with a plurality of sensor electrodes and a processing system is provided. The plurality of sensor electrodes include a first sensor electrode and a second sensor electrode. The first sensor electrode is coupled to a first channel and the second sensor electrode is coupled to a second channel. The processing system is configured to: drive the plurality of sensor electrodes with a sensing signal; drive the first channel with a first compensation signal and the second channel with a second compensation signal; determine a first differential capacitance between the first channel and the second channel; drive the first channel with the second compensation signal and the second channel with the first compensation signal; determine a second differential capacitance between the first channel and the second channel; and mitigate temperature drift using the first differential capacitance and the second differential capacitance.

In a further exemplary embodiment, a sensor driver with a processing system is provided. The sensor driver is configured to: drive a plurality of sensor electrodes with a sensing signal where the plurality of electrodes comprises a first sensor electrode coupled to a first channel and a second sensor electrode coupled to a second channel. The sensor driver is further configured to drive the first channel with a first compensation signal and the second channel with a second compensation signal; determine a first differential capacitance between the first channel and the second channel; drive the first channel with the second compensation signal and the second channel with the first compensation signal; determine a second differential capacitance between the first channel and the second channel; and mitigate temperature drift using the first differential capacitance and the second differential capacitance.

In a further exemplary embodiment, a method for capacitive sensing is provided. The method includes driving a plurality of sensor electrodes with a sensing signal where the plurality of electrodes comprises a first sensor electrode coupled to a first channel and a second sensor electrode coupled to a second channel. The method further includes driving the first channel with a first compensation signal and the second channel with a second compensation signal; measuring a first differential capacitance between the first channel and the second channel; driving the first channel with the second compensation signal and the second channel with the first compensation signal; measuring a second differential capacitance between the first channel and the second channel; and mitigating temperature drift using the first differential capacitance and the second differential capacitance.

DESCRIPTION

The following detailed description is exemplary in nature and is not intended to limit the disclosure or the application and uses of the methods and systems described herein. Furthermore, there is no intention to be bound by any expressed or implied theory presented in the preceding technical field, background, summary and brief description of the drawings, or the following detailed description.

Exemplary devices and methods discussed herein provide for mitigating the effect of temperature drift of compensation circuitry used, for example, in capacitive sensing. According to exemplary embodiments, a compensation circuit supplies compensation signals to a plurality of sensor circuits. The compensation signals are selectively applied to each sensor circuit in a way that cancels the equivalent capacitance and temperature drift of the compensation circuit. The system and method may, for example, be employed in applications using differential capacitive sensing.

In one exemplary application, the system and method may be used to mitigate temperature drift when determining a fold angle of a foldable device, e.g., a foldable display. An example of system and method for determining the fold angle of a foldable device which can employ the system and method herein is described in U.S. patent application Ser. No. 17/861,022 entitled "Capacitive Detection of Fold Angle for Foldable Devices," filed on Jul. 8, 2022, the entire contents of which are expressly incorporated by reference.

Figure 1:
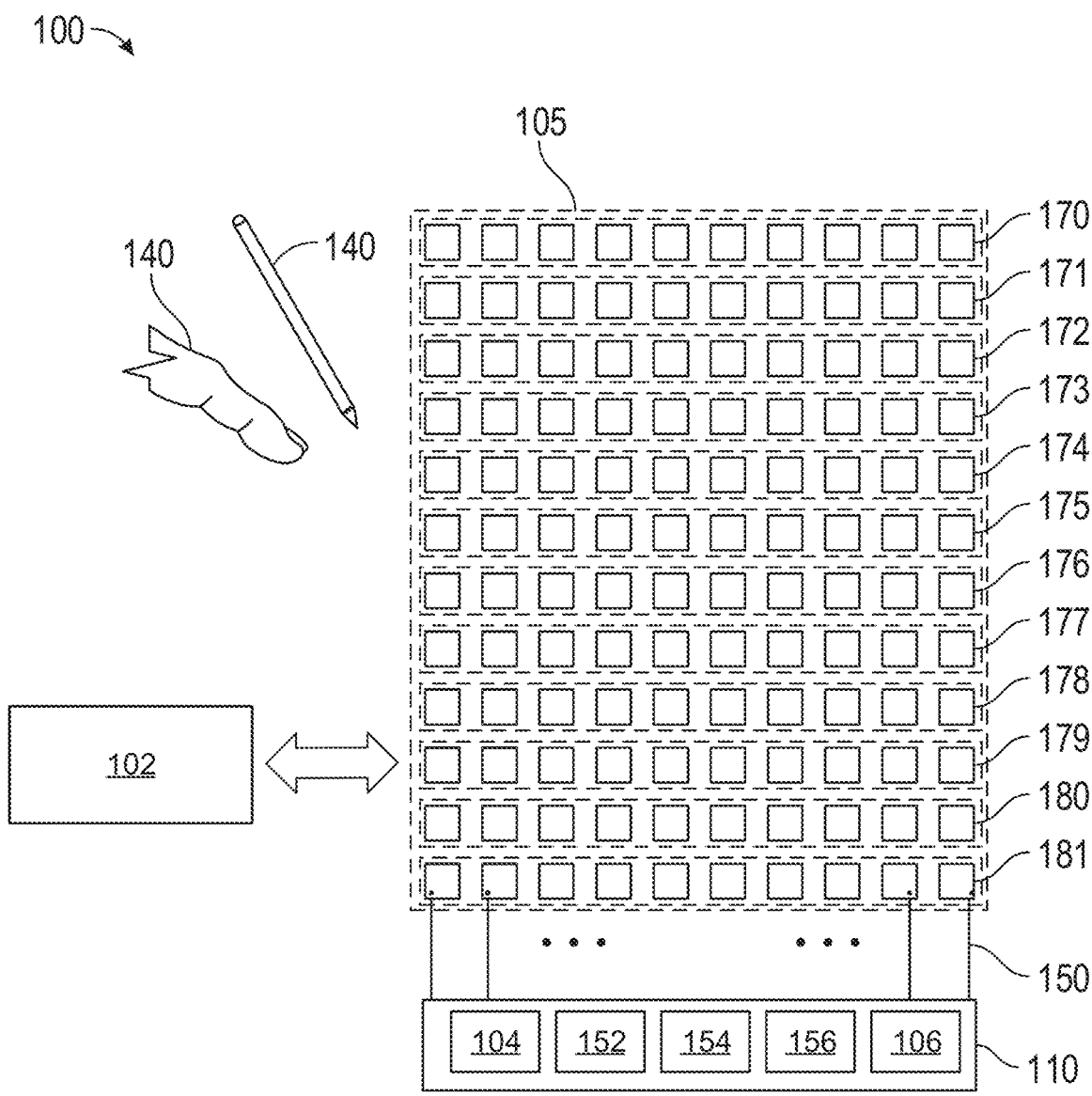
FIG. 1 is a block diagram of an input device, according to one or more embodiments.

FIG. 1 illustrates input device 100 configured to provide input to an electronic system 102. Some non-limiting examples of electronic systems include desktop computers, laptop computers, netbook computers, tablets, terminals, kiosks, cellular phones, automotive multimedia centers and internet of things (IoT) devices, among others. The input device 100 may be part of the electronic system 102 or may be a separate component communicatively coupled to the electronic system 102.

The input device 100 includes a processing system 110 and sensor electrodes 105. The processing system 110 operates the sensor electrodes 105 to detect one or more input objects 140 or other condition in a sensing area of the input device 100. Example input objects 140 include fingers and styli, as shown in FIG. 1.

The sensing area of the input device 100 encompasses any space above, around, in and/or near the input device 100 in which the input device 100 is able to detect user input, e.g., user input provided by one or more input objects 140. In certain embodiments, the input device 100 is able to detect other conditions, such as an angle at which a foldable device is open.

The sensor electrodes 105 are coupled to the processing system 110 via conductive paths, e.g., traces 150. An exemplary pattern of the sensor electrodes 105 illustrated in FIG. 1 comprises an array of sensor electrodes 105 disposed in a plurality of rows and columns. In one example, the sensor electrodes 105 are disposed in rows, e.g., rows 170-181. It is contemplated that the sensor electrodes 105 may be arranged in other patterns, such as polar arrays, repeating patterns, non-repeating patterns, non-uniform arrays, or other suitable arrangement. The sensor electrodes 105 may have any suitable shape, such as circular, rectangular, diamond, star, square, nonconvex, convex, nonconcave, concave, or other geometry.

The sensor electrodes 105 may be disposed in a common layer. For example, the sensor electrodes 105 may be disposed on a first side of a common substrate. In other embodiments, the sensor electrodes 105 may be disposed in two or more layers. For example, a portion of the sensor electrodes 105 may be disposed on a first layer and another portion of the sensor electrodes may be disposed on a second layer. The first and second layers may be disposed on different sides of a common substrate, or disposed on different substrates.

The sensor electrodes 105 may be comprised of a conductive material such as a metal mesh, indium tin oxide (ITO), or the like. Further, the sensor electrodes 105 are ohmically isolated from each other such that one or more insulators separate the sensor electrodes and prevent them from electrically shorting to each other.

The processing system 110 includes sensor circuitry 104. Further, the processing system 110 may include a determination circuit 106. The processing system 110 is configured to operate the sensor electrodes 105 to detect one or more input objects 140 or other condition in the sensing area of the input device 100. The processing system 110 fully or partially resides in one or more integrated circuit (IC) chips. For example, the processing system 110 may include a single IC chip. Alternatively, the processing system 110 includes multiple IC chips. The processing system may also include one or more discrete circuits.

The sensor circuitry 104 is coupled to the sensor electrodes 105 via the routing traces 150 and is configured to drive the sensor electrodes 105 with sensing signals to detect one or more input objects 140 in the sensing area of the input device 100. The sensor circuitry 104 may also be configured to drive the sensor electrodes 105 with other signals, such as guarding signals and/or ground signals.

The sensor circuitry 104 includes digital and/or analog circuitry. For example, the sensor circuitry 104 comprises transmitter (or driver) circuitry configured to drive sensing signals onto the sensor electrodes 105 and receiver circuitry to receive resulting signals from the sensor electrodes 105. The transmitter circuitry may include one or more amplifiers and/or one or more modulators configured to drive sensing signals on to the sensor electrodes 105.

The processing system 110 may include analog to digital converters (ADCs and/or DACs) 154, analog front ends (AFEs) 152 comprising, for example, integrators configured to receive resulting signals from the sensor electrodes 105. The processing system 110 may include compensation circuitry 156 configured to provide signals to compensate for background capacitance. An example of a compensation circuit is a global coarse baseline compensation (correction) circuit (GCBC). The ADCs (and/or DACs) 154, AFEs 152 and compensation circuit 156 may be part of the sensor circuitry 104 or may form different circuits.

In one embodiment, the sensor circuitry 104 drives a first one or more of the sensor electrodes 105 with a transcapacitive sensing signal and receives a resulting signal with a second one or more of the sensor electrodes 105 to operate the sensor electrodes 105 for transcapacitive sensing. Operating the sensor electrodes 105 for transcapacitive sensing detects changes in capacitive coupling between sensor electrodes driven with a transcapacitive sensing signal and sensor electrodes operated as receiver electrodes. The capacitive coupling may be reduced when an input object (e.g., the input object 140) coupled to a system ground approaches the sensor electrodes. Driving the sensor electrodes 105 with transcapacitive sensing signals comprises modulating the sensor electrodes 105 relative to a reference voltage, e.g., system ground.

The transcapacitive sensing signal is a periodic or aperiodic signal that varies between two or more voltages. Further, the transcapacitive sensing signal has a frequency between 50 kHz and 1 MHz. In other embodiments, other frequencies may be utilized. The transcapacitive sensing signal may have a peak-to-peak amplitude in a range of about 1 V to about 10 V. However, in other embodiments, the transcapacitive sensing signal may have a peak-to-peak amplitude greater than about 10 V or less than about 1 V. Additionally, the transcapacitive sensing signal may have a square waveform, a sinusoidal waveform, triangular waveform, a trapezoidal waveform, or a sawtooth waveform, among others.

In some embodiments, operating the sensor electrodes 105 to receive resulting signals comprises holding the sensor electrodes 105 at a substantially constant voltage or modulating the sensor electrodes 105 relative to the transcapacitive sensing signal. A resulting signal includes effect(s) corresponding to one or more transcapacitive sensing signals, and/or to one or more sources of environmental interference, e.g., other electromagnetic signals.

In one embodiment, the sensor circuitry 104 operates the sensor electrodes 105 for absolute capacitive sensing by driving a first one or more of the sensor electrodes 105 with an absolute capacitive sensing signal and receiving a resulting signal with the driven sensor electrodes. Operating the sensor electrodes 105 for absolute capacitive sensing detects changes in capacitive coupling between sensor electrodes driven with an absolute capacitive sensing signal and an input object (e.g., the input object 140). The capacitive coupling of the sensor electrodes 105 driven with the absolute capacitive sensing signal is altered when an input object (e.g., the input object 140) coupled to a system ground approaches the sensor electrodes.

The absolute capacitive sensing signal is a periodic or aperiodic signal that varies between two or more voltages. Further, the absolute capacitive sensing signal has a frequency between about 50 kHz and about 1 MHz. In other embodiments, other frequencies may be utilized. Additionally, the absolute capacitive sensing signal may have a square waveform, a sinusoidal waveform, triangular waveform, a trapezoidal waveform, or a sawtooth waveform, among others. The absolute capacitive sensing signal may have a peak-to-peak amplitude in a range of about 1 V to about 10 V. However, in other embodiments, the absolute capacitive sensing signal may have a peak-to-peak amplitude greater than about 10 V or less than about 1 V. In various embodiments, driving the sensor electrodes 105 with an absolute capacitive sensing signal comprises modulating the sensor electrodes 105. A resulting signal received while performing absolute capacitive sensing may comprise effect(s) corresponding to one or more absolute capacitive sensing signals, and/or to one or more sources of environmental interference, e.g., other electromagnetic signals. The absolute capacitive sensing signal may be the same or different from the transcapacitive sensing signal used in transcapacitance sensing.

The sensor circuitry 104 operates a first subset of the sensor electrodes 105 for absolute capacitive sensing. The first subset of the sensor electrodes 105 corresponds to one or more sensor electrodes 105 and may correspond to entire rows, e.g., rows 170, 171 referred to as a sensing region. The first subset of the sensor electrodes may correspond to two or more of the rows 170-181.

In certain embodiments, the sensor circuitry 104 drives a second subset of the sensor electrodes 105 with a guard signal. The second subset of the sensor electrodes 105 corresponds to one or more of the sensor electrodes 105 and may correspond to entire rows, e.g., rows 172, 173 referred to as guard channel(s) or region(s). In certain embodiments, the second subset of the sensor electrodes 105 comprises all remaining electrodes (e.g., all electrodes other than the first subset of electrodes), referred to as full guarding. In other embodiments, the second subset of the sensor electrodes comprises less than all remaining electrodes, referred to as partial guarding.

A sensor electrode driven with a guard signal may be referred to as a guarded sensor electrode or guard electrode. Driving a sensor electrode with a guard signal mitigates a voltage difference between the guarded sensor electrode and a sensor electrode driven with the absolute capacitive sensing signal in parallel. Driving the guard signal onto a first one or more sensor electrodes while driving the sensing signal onto a second one or more sensor electrodes results in little or no change in capacitance between the guarded sensor electrode(s) and the sensor electrode(s) driven with the absolute capacitive sensing signal.

The guard signal has at least one characteristic selected from a group of an amplitude, a phase, and a frequency in common with the absolute capacitive sensing signal. In another embodiment, the guard signal has at least two characteristics selected from a group of an amplitude, a phase, and a frequency in common with the absolute capacitive sensing signal. In yet another embodiment, the guard signal has an amplitude, a phase, and a frequency in common with the absolute capacitive sensing signal.

Additionally, the guard signal and the absolute capacitive sensing signal may have a common waveform shape. In one embodiment, the guard signal may be the same as the absolute capacitive sensing signal.

The determination circuit 106 receives the resulting signals from the sensor circuitry 104 and processes the resulting signals to determine changes in capacitive coupling of the sensor electrodes 105. The determination circuit 106 utilizes the changes in capacitive coupling of the sensor electrodes 105 to determine positional information of one or more input objects (e.g., the input object 140) or to determine a change in capacitance for other reason such as determine an angle of opening of a foldable device, e.g., foldable display. The determination circuit 106 may perform other functions, such as measuring the amount of noise present in one or more regions of a sensing area and/or determining whether positional information has been corrupted or degraded by noise.

In one or more embodiments, measurements of the changes in capacitive coupling determined from the resulting signals received from the sensor electrodes 105 may be utilized by the determination circuit 106 to form a capacitive image. The resulting signals utilized to detect the changes in capacitive coupling are received during a capacitive frame. A capacitive frame may correspond to one or more capacitive images. Multiple capacitive images may be acquired over multiple time periods, and differences between the images used to derive information about an input object 140 in the sensing area of the input device 100. For example, successive capacitive images acquired over successive periods of time can be used to track the motion(s) of one or more input objects entering, exiting, and within the sensing area.

"Positional information" as used herein broadly encompasses absolute position, relative position, velocity, acceleration, and other types of spatial information in zero, one, two or three dimensions as appropriate. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Figure 2:
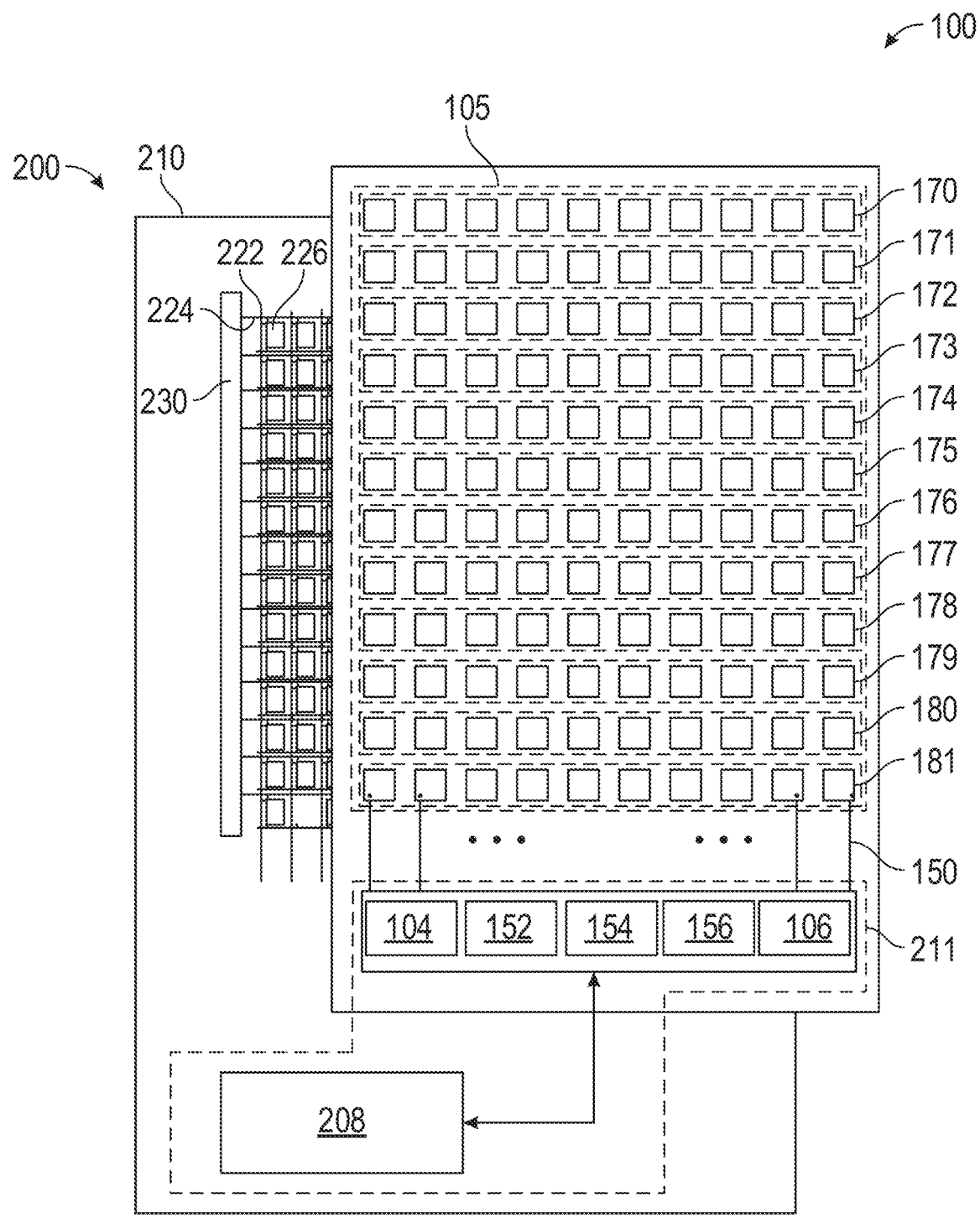
FIG. 2 is a block diagram of an input device with a display, according to one or more embodiments.

FIG. 2 illustrates an example of the input device 100 wherein the input device is shown overlapped and/or integrated with a display of a display device 200. The display of the display device 200 may be any suitable type of display such as, for example, light emitting diode (LED), microLED, organic LED (OLED), microOLED, liquid crystal display (LCD), plasma, electroluminescence (EL), or other display technology.

The display device 200 includes a display panel 210 communicatively coupled with a display driver 208 and gate selection circuitry 230. The display panel 210 includes display electrodes that are driven to update subpixel electrodes 226 of the display panel 210. The display electrodes include data lines 222 and gate lines 224, among others.

The data lines 222 are coupled to the display driver 208 and the gate lines 224 are coupled to the gate selection circuitry 230. Each of the subpixel electrodes 226 is coupled to one of the gate lines 224 and one of the data lines 222. The gate selection circuitry 230 is configured to drive gate select and gate deselect signals onto the gate lines 224 to select (activate) and deselect (deactivate) corresponding subpixels for updating.

The display driver 208 includes display driver circuitry configured to drive the data lines 222 with subpixel data signals to update the selected subpixels electrodes 226 and update the display of the display device 200. For example, the display driver 208 may drive display update signals onto the data lines 222 during corresponding display updating periods.

The display driver 208 is configured to update the subpixel electrodes 226 to update an image displayed on the display panel 210 during display frames. The display frames may be updated, or refreshed, once about every 16 ms, generating a display refresh rate of about 60 Hz. In other embodiments, other display refresh rates may be employed. For example, the display refresh rate may be 90 Hz, 120 Hz, 140 Hz, or greater.

The display driver 208, the sensor circuitry 104, the determination circuit 106, the AFEs 152, the ADCs (and/or DACs) 154, and the compensation circuitry 156 may be part of a common processing system (e.g., the processing system 211). Alternatively, the display driver 208 may be part of a first processing system and the sensor circuitry 104, AFEs 152, the ADCs (and/or DACs) 154, the compensation circuitry 156, and the determination circuit 106 may be part of a second processing system. Further, the display driver 208, the sensor circuitry 104, the AFEs 152, the ADCs 154, the compensation circuitry 156 and the determination circuit 106 may be part of a common IC chip. Alternatively, one or more of these components may be disposed in a first IC chip and a second one or more of these components may be disposed on a second IC chip, etc. As an alternative, any of the sensor circuitry 104, AFEs 152, the ADCs (and/or DACs) 154, the compensation circuitry 156, and/or the determination circuit 106 may be implemented in whole or in part by one or more discrete circuits.

In various embodiments, the sensor circuitry 104 is configured to drive the sensor electrodes for capacitive sensing during a capacitive frame at a capacitive frame rate. In one embodiment, during each capacitive frame, each of the sensor electrode 105 is operated for absolute capacitive sensing. Further, each capacitive frame may include multiple periods during which different sensor electrodes 105 are operated for absolute capacitive sensing.

The "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or multiple of the display frame rate. Further, the capacitive frame rate may be a rational fraction of the display rate (e.g., 1/2, 2/3, 1, 3/2, 2). In one or more embodiments, the display frame rate may change while the capacitive frame rate remains constant. In other embodiment, the display frame rate may remain constant while the capacitive frame rate is increased or decreased. Alternately, the capacitive frame rate may be unsynchronized from the display refresh rate or the capacitive frame rate may be a non-rational fraction of the display rate to minimize interference "beat frequencies" between the display updating and the input sensing.

In one or more embodiments, capacitive sensing (or input sensing) and display updating may occur during at least partially overlapping periods. For example, the sensor circuitry 104 is configured to operate the sensor electrodes 105 for capacitive sensing while the display driver 208 operates the gate lines 224 and data lines 222 to update an image displayed by the display panel 210. For example, updating the display panel 210 and operating the sensor electrodes 105 for capacitive sensing may be asynchronous with each other. Further, updating the display panel 210 and operating the sensor electrodes 105 for capacitive sensing may or may not be synchronized with each other.

In one or more embodiments, updating the display panel 210 and operating the sensor electrodes 105 for capacitive sensing may occur during non-overlapping periods. For example, updating the display panel 210 may occur during display update periods and operating the sensor electrodes 105 for capacitive sensing may occur during non-display update periods. The non-display update periods may be a blanking period that occurs between the last line of a display frame and the first line of the following display frame (e.g., during a vertical blanking period). Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

Figures 3A, 3B:
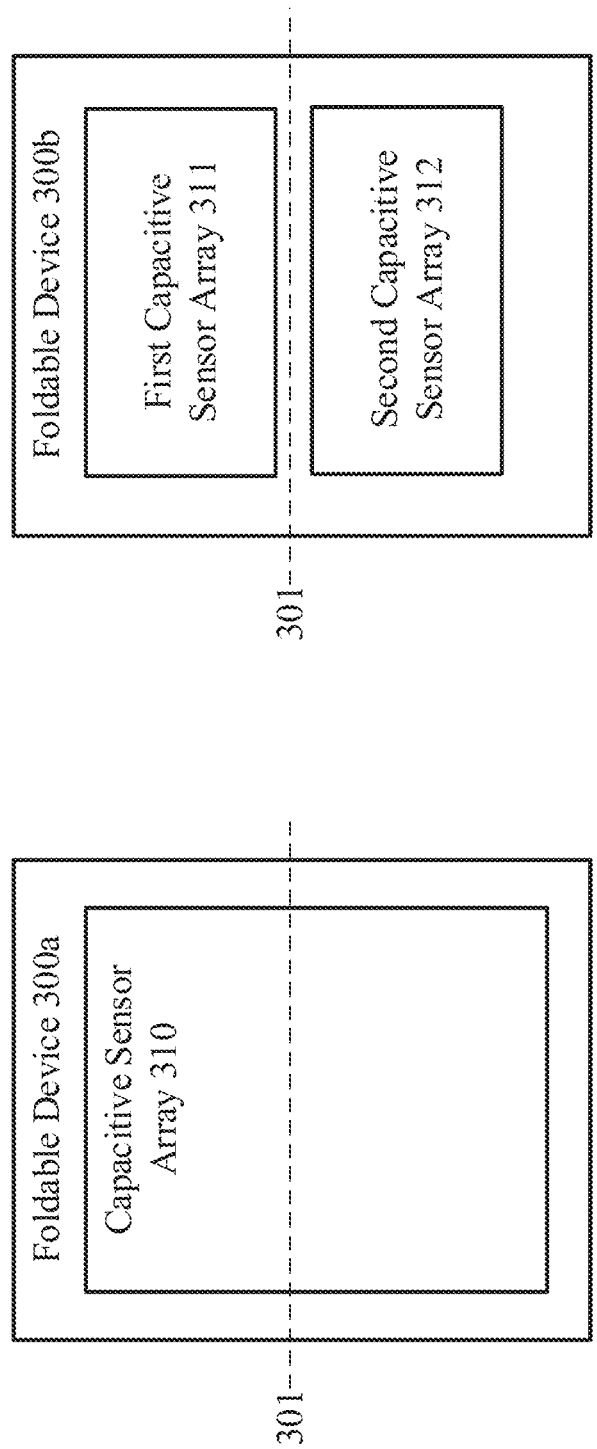
FIGS. 3A-3B are block diagrams of foldable devices, according to one or more embodiments.

FIGS. 3A-3B are block diagrams depicting example input devices, which are foldable devices in accordance with exemplary embodiments of the present disclosure. In FIG. 3A, foldable device 300a has a single capacitive sensor array 310 which spans both sides of fold line 301. Capacitive sensor array 310 may be, for example, part of a foldable touchscreen display which is part of a foldable mobile device. In FIG. 3B, foldable device 300b has multiple capacitive sensor arrays, including a first capacitive sensor array 311 on one side of fold line 301 and a second capacitive sensor array 312 on the other side of fold line 301. In one exemplary implementation, both the first and second capacitive sensor arrays 311, 312 are controlled by a single touch controller, and in another exemplary implementation, the first and second capacitive sensor arrays 311, 312 are controlled by separate touch controllers. In one exemplary implementation, both the first and second capacitive sensor arrays 311, 312 are part of respective touchscreens, and in other exemplary implementations, the first and second capacitive sensor arrays 311, 312 may be parts of different input devices (e.g., one may be a touchscreen display while the other is a touchpad or fingerprint sensor).

It will be appreciated that the foldable device depicted in FIGS. 3A-3B are merely examples, and that exemplary embodiments of the foldable device may be implemented with other types of foldable devices as well. For example, the principles discussed herein are also applicable to foldable devices with more than one fold line and/or more than two capacitive sensor arrays.

Figure 4:
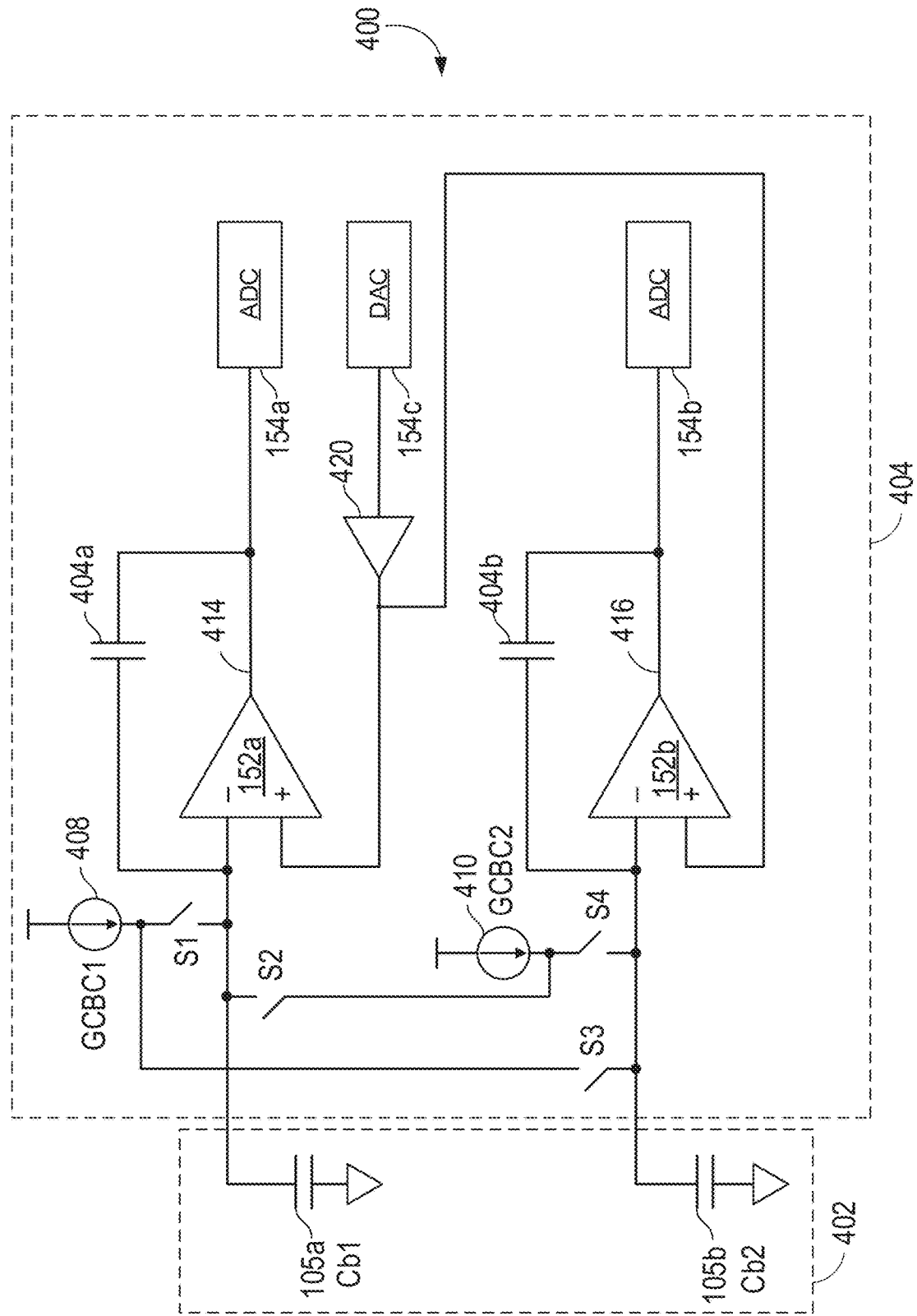
FIG. 4 is a schematic block diagram of an arrangement for performing capacitive sensing using compensation and temperature drift mitigation, according to one or more embodiments.

FIG. 4 illustrates an example of an arrangement 400 used to perform capacitive sensing with temperature drift mitigation according to certain embodiments. A plurality of sensors 402 are shown in combination with certain components 404 of processing system 110.

The arrangement 400 includes two channels each of which includes sensor electrode 105a or 105b. A channel is a common electrical path and associated processing circuitry through which resulting signals or group of resulting signals may be analyzed. A channel may be coupled to (a) a single electrode, (b) a plurality of electrodes serially multiplexed or otherwise selectively connected to the electrical path, or (c) a plurality of simultaneously interconnected electrodes. The electrodes on a particular channel may, for example, comprise part or all of a single row of electrodes, electrodes that span across part or all of multiple rows and/or electrodes that are disposed in different layers. Thus, it will be understood that each sensor electrode shown may include a single electrode or a plurality of electrodes. For example, the sensor electrode 105a represents a first channel and may include a single electrode or may include multiple electrodes, e.g., an entire row or part of an entire row. Similarly, the sensor electrode 105b represents a second channel and may include a single electrode or may include multiple electrodes, e.g., an entire row or part of an entire row. Sensor electrodes 105a and 105b may be adjacent to one another or may be spaced art. The sensor electrode 105a has a first capacitance, shown as $C_{b1}$. The sensor electrode 105b has a second capacitance, shown as $C_{b2}$. The capacitances $C_{b1}$ and $C_{b2}$ will vary depending on certain conditions, such as the presence of an input object and, in the case of foldable device, may depend on whether the device is closed or open at various angles.

In the example shown, an input of AFE 152a is coupled to the sensor electrode 105a. An output 414 of AFE 152a is coupled to ADC 154a. Feedback capacitor 404a facilitates driving the sensor electrode 105a with a sensing signal generated by, for example, DAC 154c. Similarly, an input of AFE 152b is coupled to the sensor electrode 105b. An output 416 of AFE 152b is coupled to ADC 154b. Feedback capacitor 404b facilitates driving the sensor electrode 105b with the sensing signal produced by the DAC 154c. In some implementations buffer 420 may be employed.

In general, during the capacitive sensing process, sensing signals are produced by the DAC 154c. These sensing signals drive the sensor electrode 105a and the sensor electrode 105b. Resulting signals for the sensor electrode 105a are read at the output 414 of AFE 152a, which allows capacitance $C_{b1}$ to be determined. Resulting signals for the sensor electrode 105b are read at the output 416 of AFE 152b. In certain implementations, the differential capacitance between $C_{b1}$ and $C_{b2}$ may be determined. A specific example of a differential capacitance measurement is provided in connection with FIG. 6. The differential capacitance is determined by $C_{b1}- C_{b2}$.

Large background capacitance in the sensor circuitry can, however, make determination of $C_{b1}$ and $C_{b2}$ and, when applicable, the differential capacitance difficult. Such background capacitance can be caused by close proximity, e.g., a few micrometers (μm), of the sensor electrodes 105 from layers of the display and/or ground. As a specific example, background capacitance can be in the range of several hundred picofarads (pF) while the capacitance at the sensor electrodes 105 from a finger touch can be about or less than 10 pF.

To address the problems associated with background capacitance, certain implementations use a compensation circuit. A specific example of a compensation circuit is a global coarse baseline compensation (GCBC) circuit. In FIG. 4, compensation signals from the compensation circuit are illustratively shown by current sources GCBC1 408 and GCBC2 410. Each GCBC circuit operates by charging, e.g., pre-charging, the capacitance of each sensor electrode to a certain level. Each compensation signal source may be a "copy" of a reference or baseline compensation signal. In FIG. 4, GCBC1 and GCBC2 are applied by, for example, closing switches S1 and S2 or otherwise coupling GCBC1 and GCBC2 to the sensor electrode 105a and 105b, respectively.

It will be understood that compensation circuits GCBC1 and GCBC2 have an equivalent capacitance, which is represented by equivalent capacitances $C_{gcbc1}$ and $C_{gcbc2}$ respectively. The capacitances $C_{gcbc1}$ and $C_{gcbc2}$ will be measured by ADC 154a and ADC 154b along with $C_{b1}-C_{b2}$. The differential capacitance of the first channel and the second channel then becomes:

$$(C_{b1}-C_{b2})-(C_{gcbc1}-C_{gcbc2})$$

Assuming the values of $C_{gcbc1}$ and $C_{gcbc2}$ remain constant over time, $C_{b1}-C_{b2}$ will be offset by a constant, which can be determined with a baseline measurement. However, due to mismatch, the various copies of the compensation circuit (e.g., GCBC1 and GCBC2) will have capacitance values (e.g., $C_{gcbc1}$ and $C_{gcbc2}$) that can vary over time as a result of temperature drift. When temperature drift of GCBC1 and/or GCBC2 become large relative the capacitance values being measured, the true differential measurement between $C_{b1}-C_{b2}$ becomes difficult to resolve.

To mitigate against temperature drift, the compensation signals are alternatively applied to the first channel and the second channel using any suitable means such as a switching mechanism. During a first period of time, GCBC1 is coupled to AFE 152a and GCBC2 is coupled to AFE 152b. For example, in the exemplary embodiment shown, switches S1 and S4 are closed and switches S2 and S3 open. Thus, during the first period of time, the measured differential capacitance measurement is:

$$(C_{b1}-C_{b2})-(C_{gcbc1}-C_{gcbc2})$$

During a second period of time, GCBC1 is coupled to AFE 152b and GCBC2 is coupled to AFE 152a. For example, in the exemplary embodiment shown, switches S1 and S4 are open and switches S2 and S3 are closed. Thus, during the second period of time, the measured differential capacitance measurement is:

$$(C_{b1}-C_{b2})-(C_{gcbc2}-C_{gcbc1})$$

The differential capacitance determined during the first period of time and the second period of time can be used to mitigate temperature drift. For example, if the measured differential capacitance from the first period of time is averaged with the measured differential capacitance from the second period of time, it will be appreciated that the terms $C_{gcbc1}-C_{gcbc2}$ cancel out thereby mitigating any effects from temperature drift caused by the GCBC circuits.

It will be understood that the measurements taken over the first period of time and the second period of time may be taken relatively close together in time so that any temperature change occurring during the capacitance measurements of the channels is minimized. For example, the measurements taken during the first period of time and the second period of time can be taken in successive capacitive frames. As merely one example, at a rate of 40 frames per second (fps), the amount of time between the first period of time and second period of time is 25 milliseconds (ms) assuming successive capacitive frames are used. Of course, non-successive frames and any suitable period of time can be used provided temperature change between time periods is minimized.

It will further be understood that the particular components illustrated and described in connection with FIG. 4 are by way of example and not limitation. For example, although two channels are shown, any number of suitable channels may be utilized. For example, the embodiment described in connection with FIG. 6 uses four channels. Further, although the example of FIG. 4 is described in connection with GCBC circuits, other types of compensation circuits may be employed. Yet further, the embodiment of FIG. 4 is described with switching mechanisms S1-S4, which can be any suitable form of electronic switch or other mechanism for selectively coupling the compensation circuits to the processing system. Likewise, although the arrangement 400 illustrates AFEs, ADCs and DACs, any suitable circuitry for driving sensor electrodes and reading resulting signals from the sensor electrodes may be used.

Figure 5:
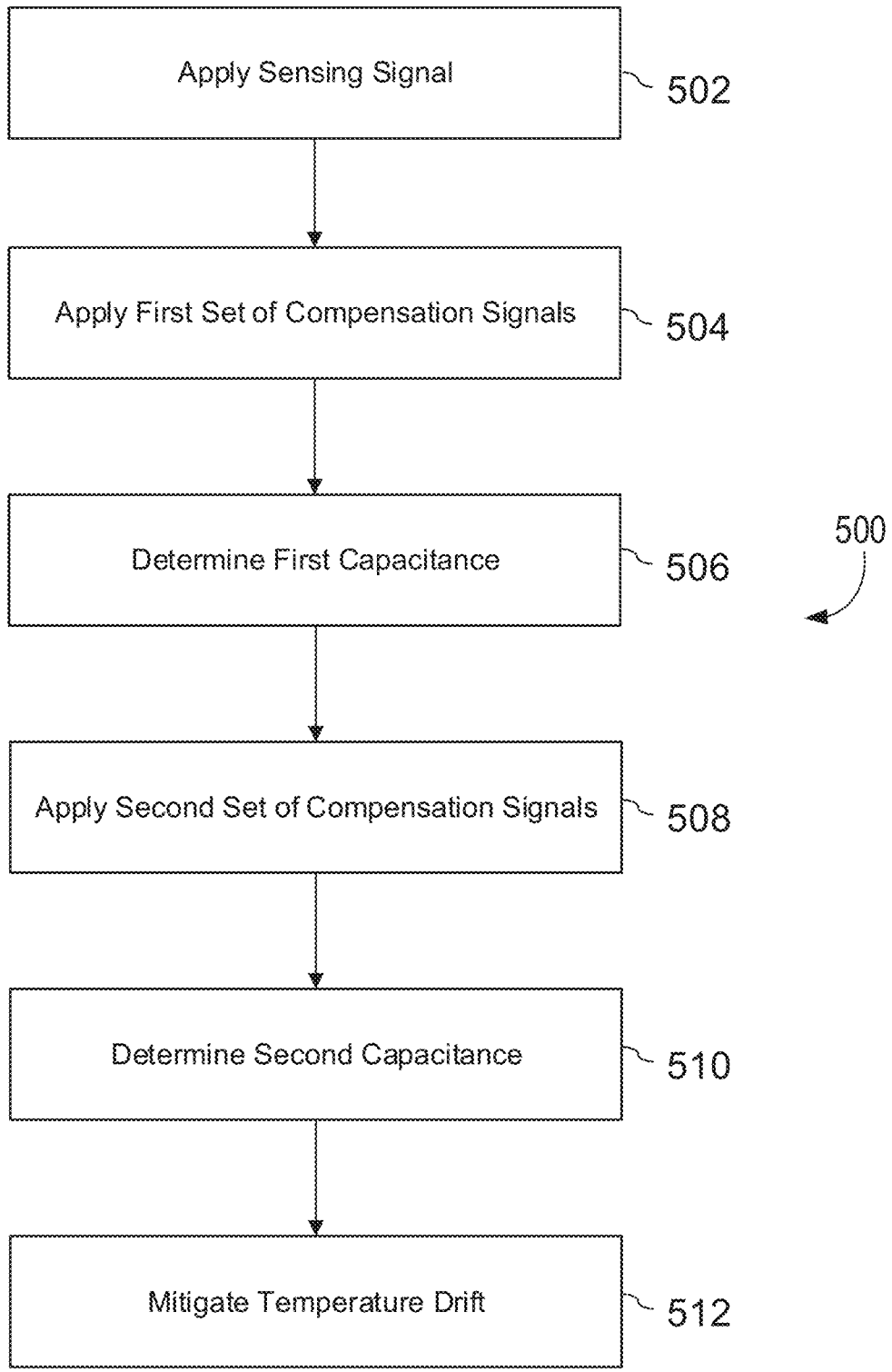
FIG. 5 illustrates a method for performing capacitive sensing using compensation and temperature drift mitigation, according to one or more embodiments.

FIG. 5 illustrates a process 500 for performing capacitive sensing in accordance with certain embodiments. The method facilitates differential capacitive sensing while mitigating against temperature drift that can occur when using compensation signals.

At stage 502, a sensing signal is applied to a plurality of sensor electrodes. For example, the sensing signal is applied to sensor electrodes 105a and 105b as shown in FIG. 4. As previously described, each of the sensor electrodes 105a and 105b may be a single electrode or multiple electrodes. In an exemplary embodiment, the sensing signal is an absolute capacitance sensing signal. It will further be understood that in other embodiments, transcapacitive sensing may be employed.

At stage 504, a first set of compensation signals are applied to the plurality of electrodes. For example, with reference to FIG. 4, first compensation signal 408 GCBC1 is applied the first channel via coupling to the sensor electrode 105a. A second compensation signal 410 GCBC2 is applied to a second channel via coupling to the sensor electrode 105b. The first set of compensation signals are applied by, for example, closing switches S1 and S4 and opening switches S2 and S3 as shown in FIG. 4.

At stage 506 a first capacitance is determined by reading resulting signals of each channel. For example, the capacitance of the first channel is measured at output 414 by ADC 154a and the capacitance of the second channel is measured at output 416 by ADC 154b. In the particular example, the first capacitance is a differential capacitance of the first channel and second channel, namely, $(C_{b1}-C_{b2})-(C_{gcbc1}-C_{gcbc2})$.

At stage 508, a second set of compensation signals is applied to the first channel and the second channel. The second set of compensation signals are a reverse of the first set of compensation signals. For example, with reference to FIG. 4, the first compensation signal 408 GCBC1 is applied the second channel via coupling to the sensor electrode 105b. The second compensation signal 410 is applied to the first channel via coupling to the sensor electrode 105a. The second set of compensation signals are applied by, for example, opening switches S1 and S4 and closing switches S2 and S3 in the example of FIG. 4.

At stage 510, a second capacitance is determined by reading resulting signals of each channel. For example, the capacitance of the first channel is measured at the output 414 by ADC 154a and the capacitance of the second channel is measured at the output 416 by ADC 154b. The second capacitance is a differential capacitance of the first channel and second channel, namely, $(C_{b1}-C_{b2})-(C_{gcbc2}-C_{gcbc1})$.

At stage 512, the effect of temperature drift is mitigated by analyzing the first capacitance and the second capacitance. Mitigation may, for example, be done by averaging determined capacitance values. For example, the first capacitance and the second capacitance are averaged to effectively cancel out capacitance resulting from the compensation circuits.

The difference in time between application of the first set of compensation signals and the second set of compensation signals (and subsequent determination of capacitance) may vary by any appropriate time frame. For purposes of mitigating temperature drift, the time difference may be limited so that any temperature change is minimized. As previously described, the first and second capacitance may be taken in consecutive frames, e.g., on the order of milliseconds apart. Alternatively, the first and second capacitance may be taken in non-consecutive frames, but still relatively close together, e.g., on the order of milliseconds apart. Depending on the environment, the time period between frames may be shorter, e.g., microseconds apart, or may longer, e.g., seconds apart.

It will be appreciated that while the foregoing method is described with respect to two channels, the method may be employed by averaging more than two channels, e.g., three channels, four channels, etc.

Figure 6:
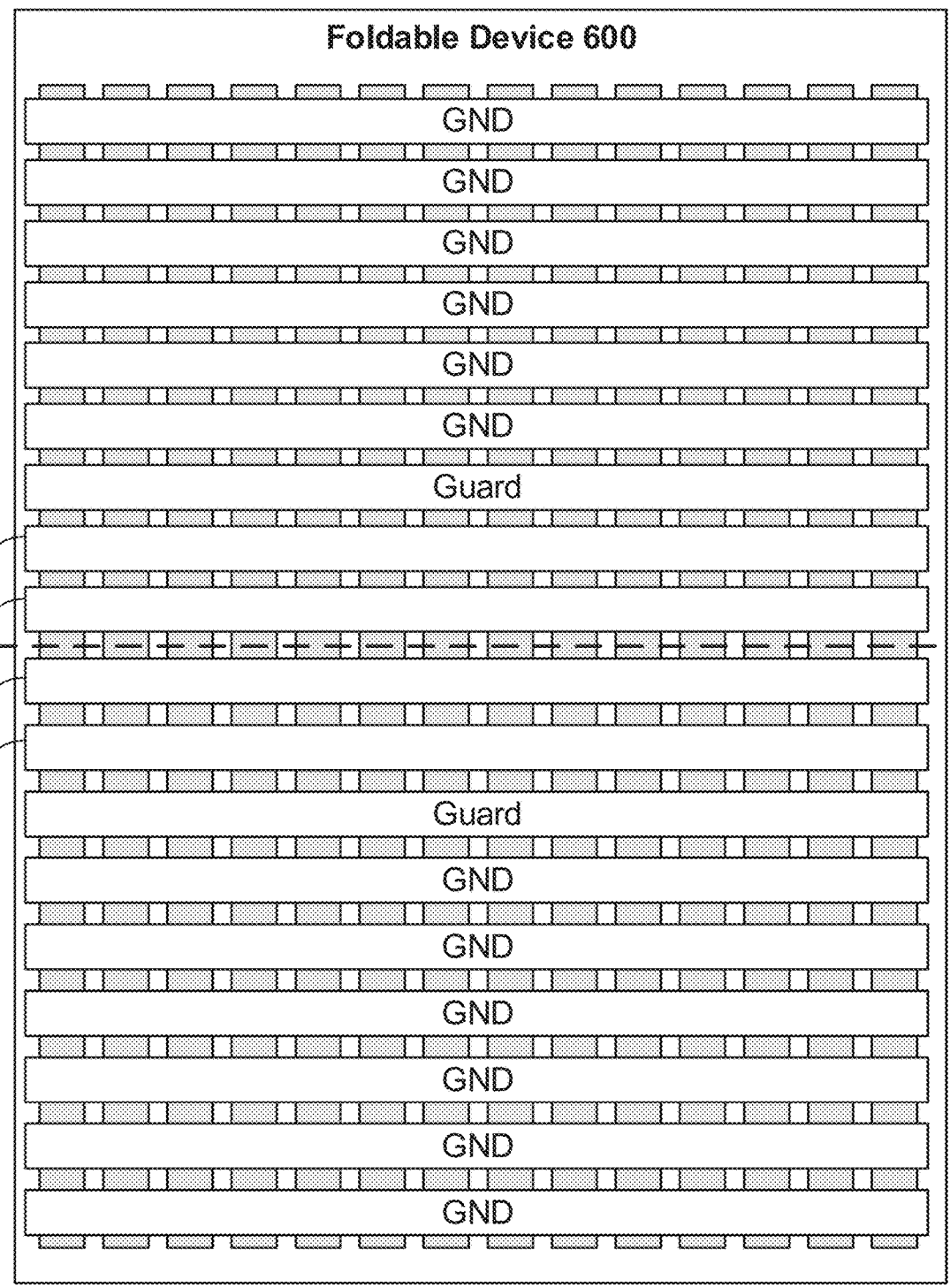
FIG. 6 illustrates an example of an arrangement for performing capacitive sensing using compensation and temperature drift mitigation, according to one or more embodiments.

FIG. 6 illustrates an example for capacitively determining a fold angle of a foldable device while mitigating the effect of temperature drift in accordance with exemplary embodiments of the present disclosure. As described in U.S. patent application Ser. No. 17/861,022, measuring capacitance values of sensor electrodes can be used to determine the fold angle in foldable device because the value of capacitance of sensor electrodes near a fold line will undergo change while sensor electrodes further away will not. By comparing a measured capacitance value with a baseline measurement, the fold angle can be determined. As further described therein, effects of temperature, errors attributable to changes in temperature and the like can be mitigated by measuring differential capacitance among electrodes. Applying the system and method herein, temperature drift of compensation circuitry can be further mitigated.

A foldable device 600 is shown. Various rows of electrodes are shown. Rows A, B, C, and D are shown relatively close to a fold line which is illustratively depicted with a dashed line. Other rows are labelled as Guard, e.g., providing a guard signal as previously describe or GND. Rows B & C are closest to the fold line and undergo measurable capacitance change as a result of folding of the device 600. Rows A and D are further away from the fold line and do not undergo a significant change in capacitance as a result of folding of the device 600. The fold signal as a function of capacitance can be described as: $C_{fold}=C_{bB}+C_{bC}-C_{bA}-C_{bD}$. $C_{fold}$ is proportional to the amount of bend thereby allowing the amount of folding, e.g., fold angle, to be ascertained.

The electrodes shown in FIG. 6 may be interconnected as two differential electrode pairs wherein each pair is interconnected for example as shown in FIG. 4 and operated as generally shown in FIG. 5. Thus, electrodes A and B are interconnected as one pair as shown in FIG. 4 and electrodes C and D are interconnected as another pair as shown in FIG. 4.

As described in connection with FIG. 5, at stage 502, a subset of sensor electrodes of the foldable device are driven with a sensing signal. For example, sensor electrodes A, B, C, D are driven by the sensing signal. In the example, the remaining electrodes are driven with a guard signal or ground (GND) signal.

At stage 504, compensation signals are applied to each set of electrodes in the differential pairs. For example, a first compensation signal GCBC1 is applied to the sensor electrode A, a second compensation signal GCBC2 is applied to the sensor electrode B, a third compensation signal GCBC3 is applied to the sensor electrode C and a fourth compensation signal GCBC4 is applied to the sensor electrode D. As previously described, each of the first, second, third and fourth GCBC signals are essentially a copy of a reference compensation signal and each is subject to varying amounts of temperature drift.

Absolute capacitance measurements obtained from the subset of sensor electrodes under measurement (stage 506) include at least one absolute capacitance measurement obtained from at least one sensor electrode whose dimensions are changed by bending at the fold line of the foldable device and at least one sensor electrode whose dimensions are unchanged (or minimally changed) by the bending of the foldable device, which is farther from a fold line of the foldable device. In an exemplary embodiment, two absolute capacitance measurements are obtained from the subset of sensor electrodes under measurement whose dimensions are changed by bending at the fold line of the foldable device, namely, sensor electrodes B and C, which are on opposing sides of the fold line. Two absolute capacitance measurements are obtained from two sensor electrodes whose dimensions are unchanged (or minimally changed), namely, sensor electrodes A and D, which are also on opposing sides of the fold line. The absolute capacitance measurements include the capacitance of each electrode as well as capacitance provided by each respective compensation circuit.

At stage 508, the compensation signals are reversed within each differential pair. For example, the second compensation signals GCBC2 is applied to sensor electrode A, the first compensation signal GCBC1 is applied to sensor electrode B, the fourth compensation signal GCBC4 is applied to sensor electrode C and the third compensation signal GCBC3 is applied to electrode D.

The absolute capacitance measurements are then obtained from the subset of sensor electrodes under measurement. In particular, at stage 510, two absolute capacitance measurements at taken from the two sensor electrodes whose dimensions are changed by bending at the fold line of the foldable device (B and C). Two absolute capacitance measurements are taken from two sensor electrodes whose dimensions are unchanged (or minimally changed) (A and D) are again determined.

To mitigate against temperature drift of the compensation circuits, the average capacitance from stages 506 and 510 is then determined. This average value is then used by the processing system of the foldable device to determine a fold angle of the foldable device. This determination takes into account reference absolute capacitance measurements taken at a known fold angle (e.g., based on calibrations performed in production and/or in runtime), such that the processing system is able to take the average absolute capacitance measurements to determine a fold angle therefrom.

The processing system (or another processor of the foldable device) may then execute one or more operations based on the determined fold angle. For example, the content displayed on a foldable device may be based on the fold angle of the foldable device, the foldable device may be put in a low power, or the foldable device may be turned "on" or "off."

It will be appreciated that numerous variations to the above process exist. For example, as one alternative, instead of treating electrodes A, B, C, and D as four separate electrodes and two differential pairs, electrodes B and C can be ganged together and electrodes A and D can be ganged together thereby creating a single differential pair.

In view of the foregoing, it will be appreciated that exemplary embodiments of the present disclosure are able to minimize the effects of display noise, reduce errors caused by temperature drift, avoid image dependency, and minimize touch-to-display coupling so as to provide a viable and accurate manner of differential capacitive sensing. Further, exemplary embodiments of the present disclosure achieve various advantages relative to conventional foldable devices-including, but not limited to, reduction in bill of material (BOM) costs, assembly labor, simplification of product design, avoidance of interference to the display caused by magnetic switch, improved reliability (a statistical side effect of fewer parts), etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device for capacitive sensing, comprising:
   a plurality of sensor electrodes including a first sensor electrode and a second sensor electrode, wherein the first sensor electrode is coupled to a first channel and the second sensor electrode is coupled to a second channel; and a processing system including a sensor circuit, configured to:
  drive the plurality of sensor electrodes with a sensing signal;
  drive the first channel with a first compensation signal and the second channel with a second compensation signal;
  determine a first differential capacitance between the first channel and the second channel;
  drive the first channel with the second compensation signal and the second channel with the first compensation signal;
  determine a second differential capacitance between the first channel and the second channel; and
  mitigate temperature drift using the first differential capacitance and the second differential capacitance.

2. The input device according to claim 1, wherein the mitigate temperature drift comprises averaging the first differential capacitance and the second differential capacitance.

3. The input device according to claim 1, further comprising a switching mechanism, wherein the switching mechanism is configured to selectively couple the first compensation signal and the second compensation signal to the first channel and the second channel.

4. The input device according to claim 1, further comprising a foldable display, wherein an average of the first differential capacitance and the second differential capacitance corresponds to angle of fold of the foldable display.

5. The input device according to claim 1, wherein the first differential capacitance and the second differential capacitance are absolute capacitances.

6. The input device according to claim 1, further comprising a global coarse baseline compensation circuit configured to:
  pre-charge capacitance of the first sensor electrode and the second sensor electrode; and
  generate the first compensation signal and the second compensation signal.

7. The input device according to claim 4, further comprising:
  a third sensor electrode and a fourth sensor electrode, wherein the third sensor electrode is coupled to the first channel and the fourth sensor electrode is coupled to the second channel.

8. The input device according to claim 7, wherein the third sensor electrode and the fourth sensor electrode are disposed further from a fold of the foldable display than the first sensor electrode and the second sensor electrode and are configured to undergo less capacitance change than the first sensor electrode and second sensor electrode when the foldable display is folded.

9. A sensor driver comprising:
a processing system including a sensor circuit, configured to:
  drive a plurality of sensor electrodes with a sensing signal, the plurality of electrodes comprising a first sensor electrode coupled to a first channel and a second sensor electrode coupled to a second channel;
  drive the first channel with a first compensation signal and the second channel with a second compensation signal;
  determine a first differential capacitance between the first channel and the second channel;
  drive the first channel with the second compensation signal and the second channel with the first compensation signal;
  determine a second differential capacitance between the first channel and the second channel; and
  mitigate temperature drift using the first differential capacitance and the second differential capacitance.

10. The sensor driver according to claim 9, wherein the processing system is further configured to mitigate temperature drift by averaging the first differential capacitance and the second differential capacitance.

11. The sensor driver according to claim 9, wherein the processing system is further configured to operate a switching mechanism to selectively couple the first compensation signal and the second compensation signal to the first channel and the second channel.

12. The sensor driver according to claim 9, wherein the processing system is further configured to average the first differential capacitance and the second differential capacitance to determine an angle of fold of a foldable display.

13. The sensor driver according to claim 9, wherein the processing system is further configured to drive the plurality of sensor electrodes with absolute capacitive sensing signals.

14. The sensor driver according to claim 9, wherein the processing system is further configured to operate a global coarse baseline compensation circuit to:
  pre-charge capacitance of the first sensor electrode and the second sensor electrode; and
  generate the first compensation signal and the second compensation signal.

15. A method for capacitive sensing using a sensor circuit, comprising:
  driving a plurality of sensor electrodes with a sensing signal, the plurality of sensor electrodes comprising a first sensor electrode coupled to a first channel and a second sensor electrode coupled to a second channel;
  driving the first channel with a first compensation signal and the second channel with a second compensation signal;
  determining a first differential capacitance between the first channel and the second channel;
  driving the first channel with the second compensation signal and the second channel with the first compensation signal;
  determining a second differential capacitance between the first channel and the second channel; and
  mitigating temperature drift using the first differential capacitance and the second differential capacitance.

16. The method according to claim 15, further comprising mitigating temperature drift by averaging the first differential capacitance and the second differential capacitance.

17. The method according to claim 15, further comprising selectively coupling the first compensation signal and the second compensation signal to the first channel and the second channel.

18. The method according to claim 15, further comprising averaging the first differential capacitance and the second differential capacitance to determine an angle of fold of a foldable display.

19. The method according to claim 15, further comprising:
  pre-charging capacitance of the first sensor electrode and the second sensor electrode with a global coarse baseline compensation circuit; and generating the first compensation signal and the second compensation signal with the global coarse baseline compensation circuit.

20. The method according to claim 15, further comprising:
coupling a third sensor electrode to the first channel and coupling a fourth sensor electrode to the second channel before driving the first channel with the first compensation signal and the second channel with the second compensation signal.

* * * * *